Patented Nov. 11, 1941

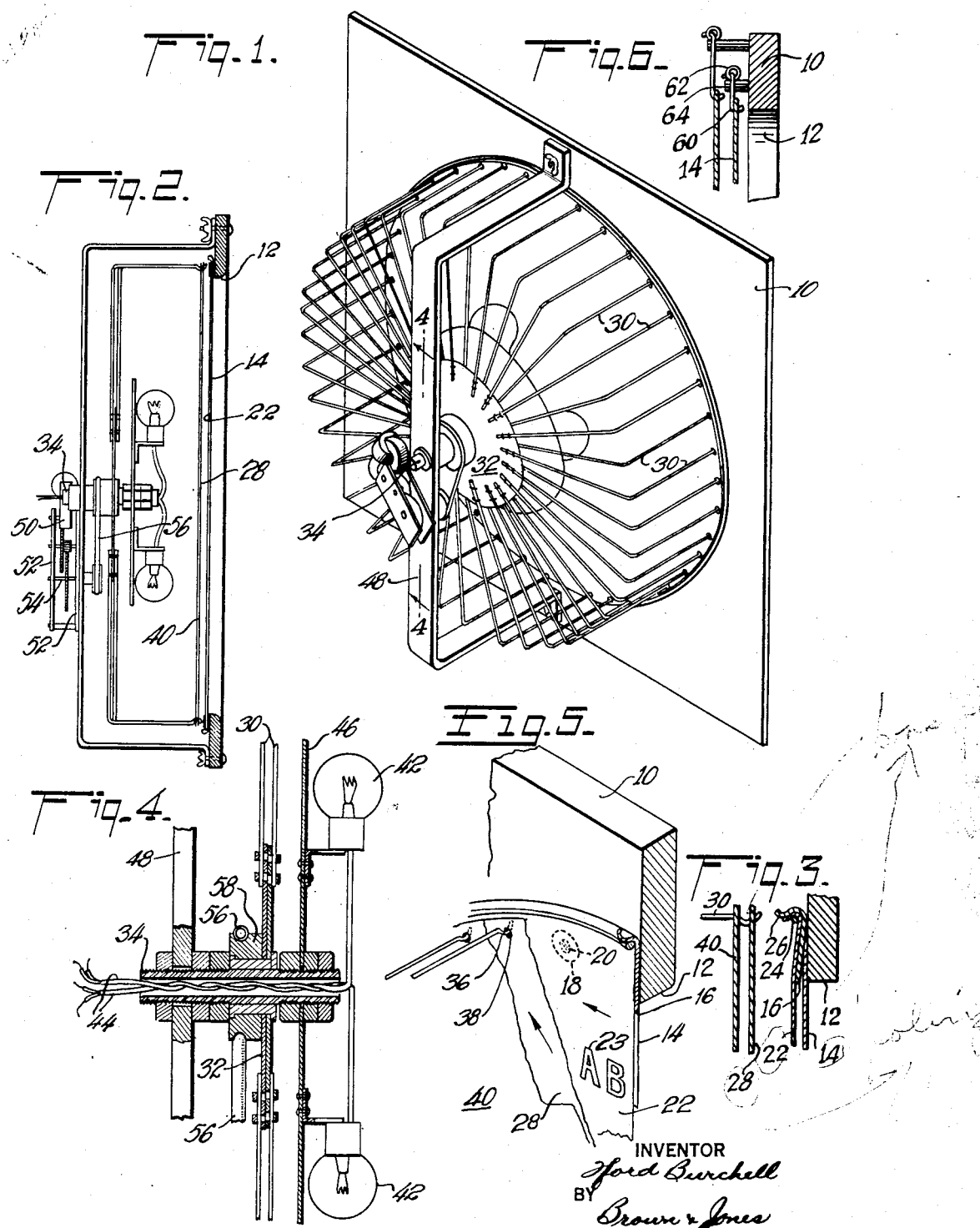

2,261,957

UNITED STATES PATENT OFFICE 2,261,957

COLOR DEVICE

Fford Burchell, Port Chester, N. Y., assignor of twenty-three one hundredths to John Q. A. Halloway, Brooklyn, N. Y., and one-tenth to James J. Ryan, New York, N. Y.

Application March 21, 1940, Serial No. 325,151

26 Claims. (Cl. 40—130)

This invention relates to color devices and more specifically to a device for exhibiting changeably colored designs.

In general, it is an object of the invention to provide a device of the character described, which will efficiently perform the purposes for which it is intended, which is simple and economical of construction, which can be expeditiously, conveniently and safely manipulated, and which can be readily manufactured and assembled.

Another object is to provide a device of the kind described in which sheets of material, which vary in size over a period of time, may be firmly held at all times under a proper tension; to provide such a device in which certain of such sheets are rotatably mounted; to provide such a device in which the sheets may be quickly and securely attached and as quickly detached; to provide such a device wherein the strains and vibrations are minimized and are prevented from harming sheets which may be large and relatively fragile and yet wherein the main structure is simple and not cumbersome.

Other objects of the invention will in part be obvious and will in part appear hereinafter.

The invention accordingly comprises the features of construction, combination of elements, and arrangement of parts, which will be exemplified in the construction hereinafter set forth and the scope of the application of which will be indicated in the claims.

For a fuller understanding of the nature and objects of the invention, reference should be had to the following detailed description, taken in connection with the accompanying drawing, in which:

Figure 1 is a perspective view, from the rear, of a device embodying one form of the invention;

Fig. 2 is an elevational view, in cross-section, of the device shown in Fig. 1;

Fig. 3 is a cross-section of a portion of the device shown in Fig. 1, the thickness of certain of the elements being out of proportion in order more clearly to show them.

Fig. 4 is a cross-section taken along the line 4—4 of Fig. 3;

Fig. 5 is an enlarged detail in perspective of the device shown in the preceding figures; and Fig. 6 is similar to Fig. 5 and shows a modification thereof.

The present invention is concerned with a device for sending light through a rotating polarizing screen, a fixed doubly-refracting screen having a design associated therewith, and a fixed polarizing screen. An observer looking toward the latter from the side opposite the light source, i. e., from the front, sees each portion of the design in one of two complementary colors or a mixture thereof, depending upon the position of the rotating screen. The colors associated with one portion may not be the colors associated with another portion.

There are difficulties attendant upon the use of rotating and/or fixed polarizing screens in those cases when the material is not laminated to a rigid support. In certain circumstances, where the designs are to be changed often or where the use of a device does not warrant an expensive structure, rigid laminating screens may not be used. Sheets of polarizing and/or doubly-refracting material, when supported only at the periphery, tend to change their dimensions, to become loose from increasing in size, or to become too taut from decreasing in size. Also, they tend not to accept unharmed the stresses and strains attendant upon motion to which they are subjected or attendant upon their being attached by means of rigidly positioned elements. This invention contemplates a device in which the sheets of such material are rotated and are often changed but in which there is avoided the undesired results enumerated above. Furthermore, the device is not heavy, cumbersome or costly.

In the drawing, 10 denotes a frame providing an opening 12 which may be of any shape, for example circular. A sheet 14 of polarizing material is held in place across the opening by having the periphery of the sheet attached to an element 16 which is attached to the frame and about the opening. The sheet may be of any kind of polarizing material, one satisfactory kind being that described in the United States patents to Edwin H. Land, and sold under the trademark "Polaroid." The sheet may be held between the element and the frame. Openings 18 in the sheet may each surround a respective screw 20 which extends between elements 10 and 16. The screws 18 attach element 16 to the frame 10. The diameter of each opening 18 in sheet 14 is considerably larger than the diameter of the shank of the screw so that the screws pass the openings without touching or harming the sheet. This arrangement allows the sheet to change its size and, in a slight amount, its position with respect to the element and the frame.

A sheet 22 of birefringent material, for example Cellophane, is fixedly positioned behind sheet 14. It may be held by a rim 24 demountably attached to element 16. The latter may have a flange 26 extending rearwardly into which rim 24 frictionally fits. The birefringent sheet may be yieldably attached to rim 24. It may also be attached behind sheet 14 between element 16 and the frame. It may have certain portions 23 thicker than other portions whereby a design is formed.

A sheet 28 of polarizing material is removably, yieldably and rotatably held behind sheet 22. In general, it may be described as carried on the rim of a cup which rotates about an axis through opening 12 and the sides of which are made of spaced rods 30. The latter are carried in any convenient fashion. Their rear ends may be attached to a disk 32 rotatably mounted on fixed shaft 34, the axis of which is preferably perpendicular to the plane of opening 12 at the center thereof. The rods are of yieldable material and may be bent to give a cup-like formation and alternate ones may be attached to the front and back of the disk. The ends of the rods may be formed into hooks 36. When holes 38 in sheet 28 are sprung over hooks 36, the resilience of rods 30 tends to hold the sheet yieldably taut. In large machines, the rods may be quite large in cross-section. In a device in which the rod ends form a circle twenty-four inches in diameter when holding a sheet, each end may move outwardly by several inches when released from the stress of the sheet 28. There may be springs attached to the rod ends for gripping the sheet 28. A sheet 40 of light-diffusing material, for example cellulose acetate, may be similarly held behind sheet 28.

Light sources 42 are provided behind sheet 40. They may be fixed to shaft 34 directly or indirectly and current-supplying wires 44 may be connected to them through the shaft. If desired, a reflecting surface 46 may be positioned behind the light sources and fixed to the shaft.

The fixed shaft 34 may be suitably supported as by the bracket 48, one end of which at least may be detachably fixed to frame 10. The latter and the bracket may act as a support for the entire device.

Any motive means may be used, that shown being a motor 50 carried between plates 52 supported on bracket 48. The motor is geared to shaft 54 which is connected by a belt 56 to hub 58 on disk 32. The belt is preferably of resiliently wound wire. The shaft 54 may be connected to hub 58 by gears.

The operation of the device is clear from the foregoing. When the motor turns the disk and rods, the polarizing sheet 28 is also rotated, so that the plane of polarization of the light from sources 42 is constantly changing direction. Hence, that light which continues out through the doubly-refracting sheet and the outer polarizing sheet changes constantly from one color to its opposite through colors which are mixtures of those two colors.

As the sheets change in size with age or with the shaking of the device, the elements which hold them do so yieldingly and thereby prevent their destruction.

The bracket element 48 may take the form of a plate to be attached to any desired support, not shown. The latter may then be properly positioned with respect to opening 12 and may be the back of a box of which element 10 is the front.

The device is readily taken apart whenever a new design is desired.

A plurality of hooks 60 may connect various points of the periphery of sheet 14 to springs, which are attached to frame 10, or to an element which yieldably extends around the periphery of opening 12. Such an element might be a long coiled spring 62 extending in a circle about pegs 64 on the back of frame 10. Sheet 22 may be similarly held.

Since certain changes may be made in the above construction and different embodiments of the invention could be made without departing from the scope thereof, it is intended that all matter contained in the above description or shown in the accompanying drawing shall be interpreted as illustrative and not in a limiting sense.

It is also to be understood that the following claims are intended to cover all of the generic and specific features of the invention herein described, and all statements of the scope of the invention, which, as a matter of language, might be said to fall therebetween.

Having described my invention, what I claim as new and desire to secure by Letters Patent is:

1. A device of the character described comprising means providing an opening, means for holding sheet material removably and yieldably across said opening, rotatable means for holding sheet material removably, rotatably and yieldably behind said opening, means for supporting the last-mentioned means and attached to the first-mentioned means, motive means carried by said supporting means, and resilient means for delivering power from said motive means to said rotatable means.

2. A device of the character described comprising means providing an opening, means for holding translucent sheet material removably and yieldably across said opening, rotatable means for holding translucent sheet material removably, rotatably and yieldably behind said opening, means for supporting the last-mentioned means, and a light source carried by said supporting means and placed between a part of said rotatable means and said opening.

3. A device of the character described comprising means providing an opening, means for holding translucent sheet material removably and yieldably across said opening, rotatable means for holding translucent sheet material removably, rotatably and yieldably behind said opening, supporting means including a shaft on which is positioned said rotatable means, and a light source supported by said shaft and placed between a part of said rotatable means and said opening.

4. A device of the character described comprising means providing an opening, means for holding sheet material removably and yieldably across said opening, rotatable means for holding translucent sheet material removably, rotatably and yieldably behind said opening, supporting means including a shaft on which is positioned said rotatable means, a light source supported by said shaft and placed between a part of said rotatable means and said opening, motive means carried by said supporting means, and resilient means for delivering torque from said motive means to said rotatable means.

5. A device of the character described comprising means providing an opening, means for holding sheet material removably and yieldably across said opening, rotatable means for holding translucent sheet material removably, rotatably and yieldably behind said opening, supporting means including a shaft on which is positioned said rotatable means, a light source supported by said shaft and placed between a part of said rotatable means and said opening, and electrically conductive means through said shaft for bringing current to said source.

6. A device of the character described comprising a shaft, rotatable carrying means supported by said shaft, a plurality of yieldable means extending from said carrying means and having ends positioned in a plane, and a sheet of polarizing material attached to said ends.

7. A device of the character described comprising supporting means, rotatable carrying means supported by said supporting means, a plurality of yieldable means extending from said carrying means and having ends positioned in a plane, and a sheet of polarizing material attached to said ends.

8. A device of the character described comprising a shaft, rotatable carrying means supported by said shaft, a plurality of yieldable rods extending from said carrying means and at least in part parallel to the axis of said shaft and having ends positioned in a plane substantially perpendicular to said axis, and a sheet of yieldable material attached to said ends.

9. A device of the character described comprising means providing an opening, means for holding translucent sheet material removably and yieldably across said opening, a shaft, rotatable carrying means supported by said shaft, a plurality of yieldable means extending from said carrying means and having ends positioned in a plane, and a sheet of translucent material attached to said ends and behind said opening.

10. A device of the character described comprising means providing an opening, means for holding translucent sheet material removably and yieldably across said opening, a shaft, rotatable carrying means supported by said shaft, a plurality of yieldable means extending from said carrying means and having ends positioned in a plane, a sheet of translucent material attached to said ends and behind said opening, and supporting means for said shaft and attached to said holding means.

11. A device of the character described comprising a shaft, a disk carried by and rotatable about the axis of said shaft, a plurality of rods extending from said disk and in part parallel to said axis and having ends positioned in a plane, and a light source between said disk and said ends and supported from said shaft.

12. A device of the character described comprising a shaft, a disk carried by and rotatable about the axis of said shaft, a plurality of rods extending from said disk and in part parallel to said axis and having ends positioned in a plane, and a light source between said disk and said ends and supported from said shaft, certain of said rods being attached to one face of said disk and others of said rods being attached to the other face of said disk.

13. A device of the character described comprising a shaft, a disk carried by and rotatable about the axis of said shaft, a plurality of rods extending from said disk and in part parallel to said axis and having ends positioned in a plane, a light source between said disk and said ends and supported from said shaft, a motor, means for supporting said shaft and said motor, and resilient means for driving said disk from said motor.

14. A device of the character described comprising a shaft, a disk carried by and rotatable about the axis of said shaft, a plurality of rods extending from said disk and in part parallel to said axis and having ends positioned in a plane, a light source between said disk and said ends and supported from said shaft, a motor, a bracket for supporting said shaft and said motor, means for rotating said disk with power from said motor, and a frame connected to said bracket and positioned in front of said plane.

15. A device of the character described comprising a shaft, a disk carried by and rotatable about the axis of said shaft, a plurality of rods extending from said disk and in part parallel to said axis and having ends positioned in a plane, a light source between said disk and said ends and supported from said shafts, a motor, means for supporting said shaft and said motor, and resilient means for driving said disk from said motor, and a sheet of light-polarizing material substantially parallel to said plane and supported by said rods.

16. A device of the character described comprising a shaft, a disk carried by and rotatable about the axis of said shaft, a plurality of rods extending from said disk and in part parallel to said axis and having ends positioned in a plane, a light source between said disk and said ends and supported from said shaft, a motor, a bracket for supporting said shaft and said motor, means for rotating said disk with power from said motor, a frame connected to said bracket and positioned in front of said plane, and means for holding sheet material removably and yieldably in front of said plane.

17. A device of the character described comprising a shaft, a disk carried by and rotatable about the axis of said shaft, a plurality of rods extending from said disk and in part parallel to said axis and having ends positioned in a plane, a light source between said disk and said ends and supported from said shaft, a motor, a bracket for supporting said shaft and said motor, means for rotating said disk with power from said motor, a frame connected to said bracket and positioned in front of said plane, and positioned to hide certain parts of said device from undesirable lateral observation by an observer in front of said device, and means for holding light transmitting and polarizing sheet material removably and yieldably in front of said plane.

18. A device of the character described comprising a shaft, a disk carried by and rotatable about the axis of said shaft, a plurality of rods extending from said disk and in part parallel to said axis and having ends positioned in a plane, a light source between said disk and said ends and supported from said shaft, a motor, a bracket for supporting said shaft and said motor, means for rotating said disk with power from said motor, a frame connected to said bracket and positioned in front of said plane, means for holding sheet material removably and yieldably in front of said plane, a sheet of polarizing material attached to the said ends of said rods, a sheet of polarizing material held by said holding means, and a sheet of birefringent material held by said holding means behind the last-mentioned sheet and provided with a design.

19. A device of the character described comprising a frame providing an opening, an element attached to said frame and having a flange, a sheet of polarizing material extending across said opening and yieldably held by said element, a rim detachably held by said flange, and a sheet of birefringent material carried by said rim.

20. A device of the character described comprising means providing an opening, means for holding translucent sheet material removably and yieldably across said opening, rotatable means for holding light transmitting and polarizing sheet material removably, rotatably and yieldably behind said opening, means for supporting the last-mentioned means and attached to the first-mentioned means, motive means carried by said supporting means, and resilient means for delivering power from said motive means to said rotatable means.

21. A device of the character described comprising a shaft, rotatable carrying means supported by said shaft, a plurality of yieldable rods extending from said carrying means and at least in part parallel to the axis of said shaft and having ends positioned in a plane substantially perpendicular to said axis, and a sheet of light transmitting and polarizing yieldable material attached to said ends.

22. A device of the character described comprising means providing an opening, means for holding translucent sheet material removably and yieldably across said opening, a shaft, rotatable carrying means supported by said shaft, a plurality of yieldable means extending from said carrying means and having ends positioned in a plane, and a sheet of light transmitting and polarizing material attached to said ends and behind said opening.

23. A device of the character described comprising means providing an opening, means for holding translucent sheet material removably and yieldably across said opening, a shaft, rotatable carrying means supported by said shaft, a plurality of yieldable means extending from said carrying means and having ends positioned in a plane, a sheet of light transmitting and polarizing material attached to said ends and behind said opening, and supporting means for said shaft and attached to said holding means.

24. A device of the character described comprising a shaft, a disk carried by and rotatable about the axis of said shaft, a plurality of rods extending from said disk and in part parallel to said axis and having ends positioned in a plane, and a light source between said disk and said ends and supported from said shaft, and a sheet of light-polarizing material substantially parallel to said plane and supported by said rods.

25. A device of the character described comprising a shaft, a disk carried by and rotatable about the axis of said shaft, a plurality of rods extending from said disk and in part parallel to said axis and having ends positioned in a plane, and a light source between said disk and said ends and supported from said shaft, certain of said rods being attached to one face of said disk and others of said rods being attached to the other face of said disk, and a sheet of light-polarizing material substantially parallel to said plane and supported by said rods.

26. A device of the character described comprising a shaft, a disk carried by and rotatable about the axis of said shaft, a plurality of rods extending from said disk and in part parallel to said axis and having ends positioned in a plane, a light source between said disk and said ends and supported from said shaft, a motor, a bracket for supporting said shaft and said motor, means for rotating said disk with power from said motor, and a frame connected to said bracket and positioned in front of said plane, and a sheet of light-polarizing material substantially parallel to said plane and supported by said rods.

FFORD BURCHELL.